Aug. 7, 1956  H. C. SIMMONS ET AL  2,757,697
SLICING BLADE OR BAND
Filed June 7, 1950  3 Sheets-Sheet 1

INVENTORS
HARYL C. SIMMONS
BY ANTHONY J. METZ

ATTORNEY

Aug. 7, 1956   H. C. SIMMONS ET AL   2,757,697
SLICING BLADE OR BAND
Filed June 7, 1950   3 Sheets-Sheet 2
FIG. 5   FIG. 6   FIG. 4
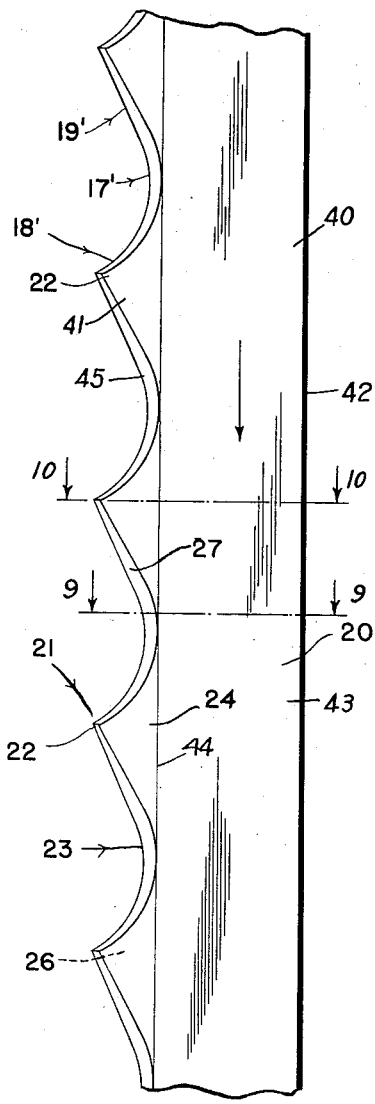
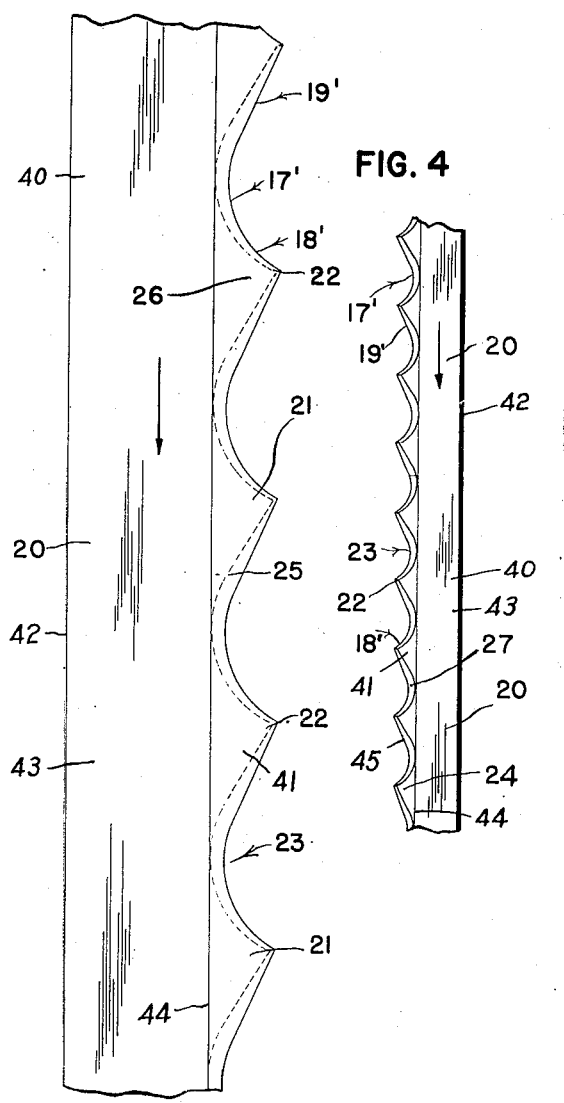
*INVENTOR.*
HARYL C. SIMMONS
BY ANTHONY J. METZ
ATTORNEY

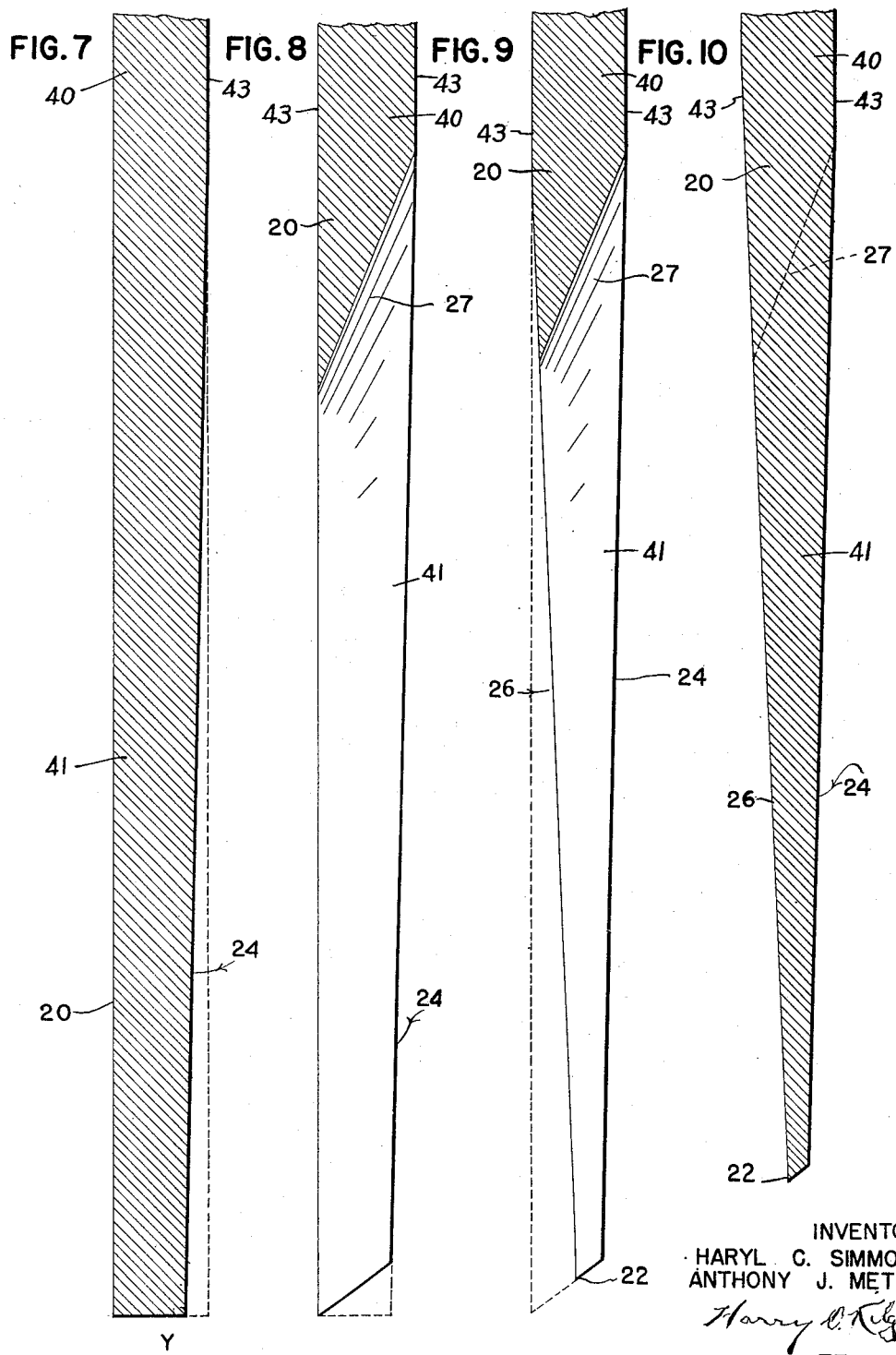

United States Patent Office 2,757,697
Patented Aug. 7, 1956

2,757,697

SLICING BLADE OR BAND

Haryl C. Simmons, Anoka, Minn., and Anthony J. Metz, Davenport, Iowa; said Metz assignor to said Simmons Application June 7, 1950, Serial No. 166,694

5 Claims. (Cl. 146—88)

Our invention relates to improvements in slicing blades or bands and, more particularly, to the type having longitudinally spaced teeth.

While the invention is intended for general use where this type of blade is desirable, it is especially well adapted for embodiment in an endless blade or band for use in bakeries for slicing bread prior to the wrapping thereof.

For the sake of convenience and simplicity, the invention will hereinafter be described and referred to as an endless band for use in slicing loaves of bread.

The principal object of this invention is to provide an endless band having novel longitudinally spaced teeth, which produce a smooth cutting action that will cut a slice from a loaf of bread with a minimum amount of side friction and without removing any of the bread material by the slicing action, and hence the absence of so-called "snow" which may be likened by comparison to sawdust, the same being the result of a sawing, rather than a true slicing action, of the conventional type of blade heretofore used.

Another object of the invention is to provide novel slicing teeth, the tips of which are at the transverse center of the band and in which the gullets are formed to hold said teeth for true straight-line movement through a loaf of bread.

A further object of this invention is to provide novel slicing teeth that tend to draw a loaf of bread toward the band during the slicing action therethrough, with a minimum amount of crushing of the bread being sliced.

A further object of this invention is to provide novel slicing teeth that are reinforced to prevent breaking of the band.

A still further object of this invention is to provide a novel slicing blade in which there is a complete absence of vibration over the complete range of operating speeds.

Other objects of this invention will be apparent from the following description, reference being had to the drawings.

To the above end, generally stated, the invention consists of the novel construction and arrangement hereinafter described and defined in the claims.

In the accompanying drawings, which illustrate the invention, like characters indicate like parts throughout the several views.

Referring to the drawings:

Fig. 4 is a view corresponding to Fig. 1 but illustrating another type of the invention;

Fig. 5 is a view corresponding to Fig. 2, but illustrating the invention shown in Fig. 4;

Fig. 6 is a view illustrating the opposite side of the slicing band from that shown in Fig. 5;

Fig. 7 is a transverse sectional view of a band of suitable material which can be employed to make the new and improved slicing blade as when said band is partially cut away during manufacture of the blade;

Fig. 8 is a transverse sectional view of the band of Fig. 7 as when an additional operation has been performed in the process of manufacture;

Fig. 9 is an enlarged transverse sectional view taken on line 9—9 of Fig. 5, and Fig. 10 is an enlarged transverse sectional view taken on line 10—10 in Fig. 5.

Figure 2:
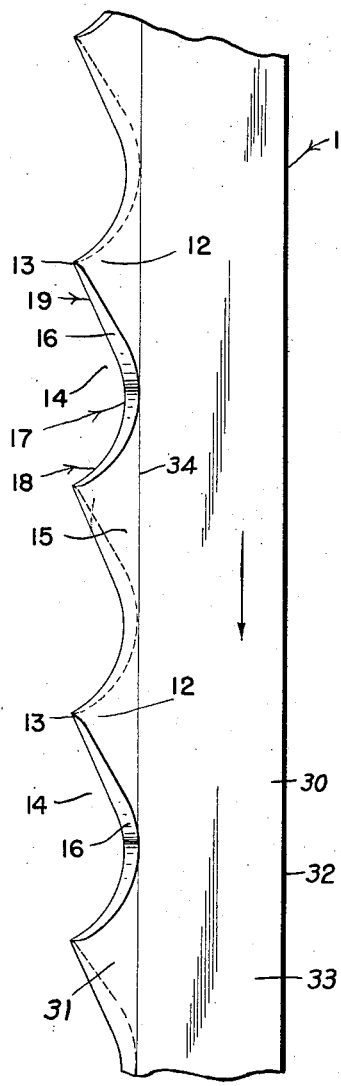
Fig. 2 is a view corresponding to Fig. 1, but on a greatly enlarged scale.
Figure 3:
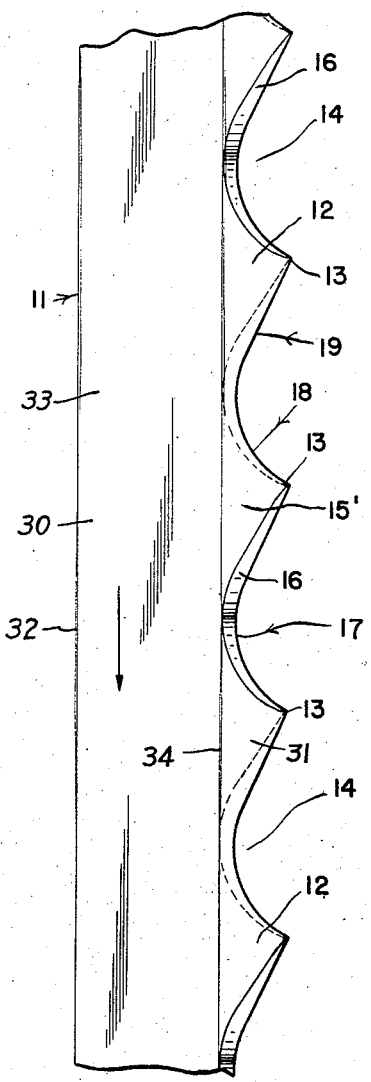
Fig. 3 is a view illustrating the opposite side of the slicing band from that shown in Fig. 2.
Figure 1:
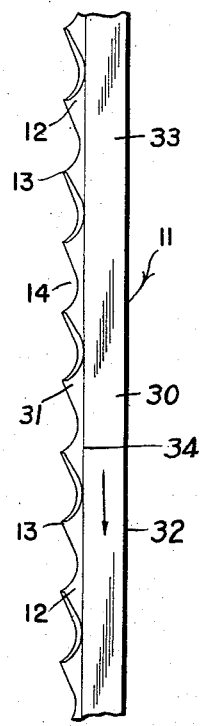
Fig. 1 is a fragmentary view illustrating one side of one type of the improved slicing band, actual size.

Referring first to the invention shown in Figs. 1, 2 and 3, wherein the numeral 11 indicates a fragment of a thin endless band that is rectangular in cross-section: In one of the longitudinal edge portions of the band 11 are longitudinally spaced teeth 12, the tips of which are designated by the numeral 13 and their gullets by the numeral 14. The band 11 comprises a body having a base section 30 and a cutting section 31. The base section 30 includes a back edge 32 and a pair of opposite parallel sides, denoted 33, 33, which extend perpendicular to the back edge 32 toward a cutting edge on the cutting section 31. Said cutting edge is scalloped to provide a series of alternate peaks and valleys, hereinbefore referred to as tips 13 and gullets 14. The parallel sides 33, 33 extend from the back edge 32 toward the cutting edge 31 and terminate in a zone defined by a line 34 intermediate said back edge and the cutting edge on said cutting section.

The tips or peaks 13 of the teeth 12 are at the transverse center of the band 11. The sides of the band 11 are beveled from points inwardly of the bottoms of the gullets or valleys 14 to the tips or peaks 13 of the teeth 12, as indicated at 15 and 15'. The sides of the bands 11 are further beveled, as indicated at 16, and these bevels 16 are staggered from one side of the band 11 to the other. The bevels 16 extend abruptly from intermediate points on one side of the band 11 to the other side thereof and form the cutting edges in the gullets or valleys 14. The cutting edge in each gullet or valley 14, between front and rear adjacent tips or peaks 13, is on the arc 17 of a circle at the bottom of said gullet or valley and just rearwardly of the front tip or peak 13. Said cutting edge extends on a short steep tangent 18 from the arc 17 to the front tip or peak 13 and on a long gradually inclined tangent 19 from said arc to the rear tip or peak 13. Stated otherwise, the peaks 13 lie along a line in the median plane between the sides or side surfaces 33, 33.

The scallops are confined to the cutting section 31 and do not extend into the base section 30.

The invention shown in Figs. 4, 5 and 6 is substantially like the invention just described, except that the bevels similar to the bevels 16 are all on the same side of the band. In this showing of the invention, the band is designated by the numeral 20 and the teeth, their tips or peaks and their gullets or valleys are designated, respectively, by the numerals 21, 22 and 23.

The tips or peaks 22 are at the transverse center of the band 20 and on one side thereof is a wide bevel 26 that extends to the tips or peaks 22. On the other side of the band 20 is a wide bevel 24 that does not extend quite to the tips or peaks 22 but is spaced slightly outwardly thereof to thicken the stock at said tips or peaks and reinforce the teeth 21. The band 20 is further abruptly beveled at 27 between the points 22 at each gullet or valley 23 from the bevel 24 to the bevel 26 and forms the gullets or valleys 23 and their cutting edges. The cutting edges in the gullets or valleys 23 are identical with the cutting edges in the gullets or valleys 14 and are given the same reference numerals followed by a prime.

The blade constructed according to the embodiment of Figs. 4 to 10 comprises a body having a base section 40 and a cutting section 41. The base section 40 includes a back edge 42 and a pair of opposite parallel sides or side surfaces 43, 43 which extend perpendicular to the back edge 42 toward a cutting edge provided on the cutting section 41. Said cutting section 41 is scalloped to provide a series of alternate tips or peaks 22 and gullets or valleys 23. The parallel sides or side surfaces 43, 43 terminate in a zone defined by a line 44 intermediate the back edge 42 and the cutting edge on said cutting section 41. The peaks 22 lie along a line in the median plane between the sides or side surfaces 43, 43, and this line could be in any parallel plane between the longitudinal planes of the sides or side surfaces 43, 43. The scallops are confined to the cutting section 41 and do not extend into the base section 40. The primary beveled surfaces 24, 26 of the cutting section 41 adjoin the sides or side surfaces 43, 43. Said beveled surfaces 24, 26 converge from the sides or side surfaces 43, 43 toward the line of the peaks 22.

As disclosed the bevels 15, 16, 24 and 26 are flat in cross-section.

In Fig. 7 the band there shown is partially cut away to produce the beveled surface 24. In Fig. 8 the band there shown is further cut away to produce the bevel 27. And in Figs. 9 and 10 the bands there shown are further cut away to produce the bevel 26. The process of manufacture can be modified so that both the bevels 24 and 26 are produced before the bevel 27 is produced, or the bevel 27 can be produced before said bevels 24 and 26 are produced. The sequence of the operations is immaterial.

The secondary beveled face 27 adjoins or merges with the primary beveled face 24 and converges toward and sharply meets the opposite beveled face 26 to provide a keen sharp cutting edge portion 45 on the profile of each gullet or valley 23. That is, the secondary bevel 27 forms an acute angle with the primary beveled face 26 and an obtuse angle with the beveled face 24, to the line 44 along which the beveled face 24 and the side surface at the corresponding side of the band meet.

The arrows in Figs. 4, 5 and 6 indicate the direction of travel of the blade. The cutting edge which extends on a long gradually inclined tangent 19' accomplishes the cutting operation smoothly and evenly, and the cutting edge which extends on a short steep tangent 18' follows through after the cut is made.

As heretofore stated, while the invention is shown and described as an endless blade or band, it is equally well adapted for embodiment in a straight blade. In this connection, however, it will be understood that the spacing of the points, the size of the blade, and the depth of the gullets or valleys may be varied depending upon to what use the blade is to be adapted.

Finally, and very highly important, we have achieved in the design of our slicing band, the complete absence of vibration at all operating speeds due to the removal of the surplus material on the band as heretofore described. This absence of vibration obviously permits smooth straight line slicing action as well as eliminates damage to expensive guide fingers and drums in the slicing machine in which said bands operate. Heretofore, all other types of slicing bands running at the necessary operating speeds, have set up a terrific vibration due to the presence of the surplus material in the slicing band thereby causing the points of said bands to dig into the guide fingers and drums with resultant damage to this equipment as well as the damage and dulling effect on the slicing band itself because of this metal to metal vibrating contact at high operating speeds. In an effort to overcome such damage due to this metal to metal contact, it has heretofore been practice in the trade to introduce lubrication to these various parts, however such practice is undesirable as it is obviously highly unsanitary.

In our slicing band, because there are no vibrating points contacting the metal of the various parts of the slicing machine proper, no lubrication whatever is required thereby affording completely sanitary operation in this respect.

Further, this complete absence of vibration of our slicing band at operating speeds permits the bands to be maintained sharp by honing while the slicing bands are in the slicing machine. This practice eliminates the necessity of frequent removal of the bands from the machine to send the same to the manufacturer for resharpening. Such practice is costly as it not only entails the cost of the regrinding and sharpening operation, but labor, and transportation costs of shipment of the bands to and from the manufacturer.

In view of the foregoing, by the use of our slicing band, maintenance costs are obviously and materially lowered which fact will naturally reflect on the consumer in the form of a lower manufacturing cost of breads.

What we claim is:

1. A slicing band comprising an elongated thin strip adapted to be moved in a first longitudinal direction, bounded by parallel, opposite side surfaces, having a cutting section and a base section integral with said cutting section, said cutting section being cut away to provide in profile a plurality of teeth therein, said teeth including peaks and valleys, each of said teeth being partially bounded in profile by a straight cutting edge extending from said peak a major portion of the way toward the next adjacent valley in said first direction, said cutting section being partially bounded by first and second primary beveled surfaces extending from side surfaces at the boundary between said cutting section and said base section to intersect with each other in the immediate vicinity of said peaks, each of said teeth of said cutting section also being partially bounded by a secondary beveled surface extending from one of said first and second primary beveled surfaces at position spaced from said cutting edge to intersect the other of said first and second primary beveled surfaces along said cutting edge of said tooth.

2. A cutting blade comprising an elongated, relatively thin body adapted to be moved in a first longitudinal direction having a back edge, a cutting edge, and opposite, generally parallel sides; said cutting edge being scalloped lengthwise thereof to provide a series of alternate peaks and valleys, portions of said cutting edge being constituted as a plurality of straight lines each extending from one of said peaks a major portion of the way toward the next adjacent valley in said first direction, said peaks lying on a line parallel to the back edge and between the planes of the sides; said sides extending from the back edge toward the cutting edge and terminating in a zone intermediate said back edge and said peak line; opposite primary beveled faces extending throughout the length of the body and respectively adjoining the sides of the body along continuous lines and converging therefrom toward said peak line and gradually thinning out the thickness of the body between said zone and the cutting edge, and a single secondary beveled face along at least a portion of the profile of each valley between one peak and a neighboring following peak, and merging with the primary beveled face at one side of the valley and converging with the opposite primary beveled face on the opposite side of the valley to provide said cutting edge.

3. A slicing band for cutting bread comprising an elongated thin body having a back edge, a cutting edge and opposite, generally parallel sides; said cutting edge being scalloped lengthwise thereof to provide a series of alternate peaks and valleys, said peaks lying in a straight line between the planes of the sides; said sides extending from the back edge toward the cutting edge and terminating in a zone intermediate said back edge and said peak line, and the valleys extending from said peak line toward said back edge; opposite, primary beveled faces extending throughout the length of the body and respectively adjoining the sides of the body along continuous lines and converging therefrom toward said peak line and gradually thinning out the thickness of the body between said zone and the cutting edge, a single secondary beveled face along at least a portion of the profile of each valley between one peak and a neighboring peak, and further merging with said primary beveled face at one side of the valley and converging toward the opposite primary beveled face to provide on said valley a cutting edge portion intermediate said neighboring peaks and said opposite, primary beveled faces lying in spaced, adjacent relation to each other at said peaks.

4. A slicing band for cutting bread comprising an elongated thin body having a back edge, a cutting edge and opposite, generally parallel sides; said cutting edge being scalloped lengthwise thereof to provide a series of alternate peaks and valleys, said peaks lying in a straight line between the planes of the sides; said sides extending from the back edge toward the cutting edge and terminating in a zone intermediate said back edge and said peak line, and the valleys extending from said peak line toward said back edge; opposite first and second primary beveled faces extending throughout the length of the body and respectively adjoining the sides of the body along continuous lines and converging therefrom toward said peak line and gradually thinning out the thickness of the body between said zone and the cutting edge, said first and second primary beveled faces lying in spaced apart, adjacent relation to each other at said peak, and a secondary beveled face along the profile of each valley between one peak and a neighboring peak, and further merging with said first primary beveled face at one side of the valley, converging with the second primary beveled face at the opposite side of the valley to provide on said valley a cutting edge portion intermediate said neighboring peaks and converging with neighboring secondary beveled faces along a transverse line extending from said peak toward said first primary beveled face.

5. A cutting blade, comprising: an elongated, relatively thin body having a back edge, a cutting edge, and opposite, generally parallel sides; said cutting edge being scalloped lengthwise thereof to provide a series of alternate peaks and valleys, said peaks being alined and lying between the planes of the sides; said sides extending from the back edge toward the cutting edge and terminating in a zone intermediate said back edge and said peak line; opposite, primary beveled faces extending throughout the length of the body and respectively adjoining the sides of the body along straight lines and converging therefrom toward said peak line and gradually thinning out the thickness of the body between said zone and the cutting edge; a secondary beveled face along at least a portion of the profile of each valley between one peak and a neighboring peak, and further adjoining the primary beveled face at one side of the valley at an obtuse angle and converging toward and joining the opposite primary beveled face at an acute angle to provide on said valley a cutting edge portion intermediate said neighboring peaks and the profile of each valley includes a relatively long cutting edge portion extending from one peak a major portion of the distance between said one peak and a neighboring peak, and a contiguous relatively short hooked cutting edge portion extending the remainder of the distance to said neighboring peak.

References Cited in the file of this patent

UNITED STATES PATENTS

| 54,681 | Buschman | May 15, 1866 |
|---|---|---|
| 276,951 | Baker | May 1, 1883 |
| 617,964 | Krank | Jan. 17, 1899 |
| 1,246,905 | Garlock | Nov. 20, 1917 |
| 1,911,974 | Shelton | May 30, 1933 |
| 2,002,812 | Hansen | May 28, 1935 |
| 2,118,197 | Hartman | May 24, 1938 |
| 2,596,851 | Hansen | May 13, 1952 |

FOREIGN PATENTS

| 322,398 | Great Britain | Dec. 5, 1929 |
|---|---|---|
| 592,234 | Great Britain | Sept. 11, 1947 |